US012505302B2

(12) United States Patent
Sundaram et al.

(10) Patent No.: US 12,505,302 B2
(45) Date of Patent: Dec. 23, 2025

(54) SYSTEMS AND METHODS RELATING TO MINING TOPICS IN CONVERSATIONS

(71) Applicant: GENESYS CLOUD SERVICES, INC., Daly City, CA (US)

(72) Inventors: Ramasubramanian Sundaram, Hyderabad (IN); Basil George, Hyderabad (IN)

(*) Notice: Subject to any disclaimer, the term of this patent is extended or adjusted under 35 U.S.C. 154(b) by 299 days.

(21) Appl. No.: 17/708,679

(22) Filed: Mar. 30, 2022

(65) Prior Publication Data
US 2023/0315998 A1 Oct. 5, 2023

(51) Int. Cl.
G06F 40/35 (2020.01)
G06F 16/2458 (2019.01)
G06F 40/117 (2020.01)
G06F 40/253 (2020.01)
G06F 40/289 (2020.01)

(52) U.S. Cl.
CPC .......... *G06F 40/35* (2020.01); *G06F 16/2465* (2019.01); *G06F 40/117* (2020.01); *G06F 40/253* (2020.01); *G06F 40/289* (2020.01)

(58) Field of Classification Search
CPC ...... G06F 40/35; G06F 40/117; G06F 40/253; G06F 40/289
See application file for complete search history.

(56) References Cited

U.S. PATENT DOCUMENTS 9,378,202 B2 * 6/2016 Larcheveque ...... G10L 15/1815
11,334,608 B2 * 5/2022 Mahata ............... G06F 16/3344
2011/0307485 A1 * 12/2011 Udupa ................... G06Q 30/02 707/769
2012/0209605 A1 * 8/2012 Hurvitz ................ G06F 16/685 704/235
2015/0317303 A1 * 11/2015 Zhang ..................... G06F 40/40 707/776
2019/0182382 A1 * 6/2019 Mazza ................. H04M 3/527

OTHER PUBLICATIONS

Tu, Yuwei, et al. "A domain-independent text segmentation method for educational course content." 2018 IEEE International Conference on Data Mining Workshops (ICDMW). IEEE, 2018 (Year: 2018).*

(Continued)

*Primary Examiner* — Bhavesh M Mehta
*Assistant Examiner* — Nandini Subramani

(57) ABSTRACT

A method for mining topics discussed in conversations that includes: receiving conversation data; and using a topic mining algorithm to mine topics from the conversation data. The topic mining algorithm includes identifying candidate topics in each of the conversations. The topic mining algorithm further includes identifying the topics of the conversations by: compiling a list of the candidate topics; pruning the list of candidate topics by discarding certain of the candidate topics per a cross-conversation factor that factors usage across all conversations; and identifying the candidate topics remaining on the pruned list of candidate topics as the topics. The topic mining algorithm further includes determining topic groups by grouping the topics according to a degree of semantic similarity between the topics; and associating a list of utterances with the topic groups.

19 Claims, 4 Drawing Sheets

(56) References Cited

OTHER PUBLICATIONS

El-Beltagy, S. R. et al. (2009). KP-Miner: A keyphrase extraction system for English and Arabic documents. Information systems, 34(1), 132-144. (Year: 2009).*
PCT Search Report and Written Opinion regarding co-pending PCT application having application No. PCT/US2023/016870 mailed on Jun. 16, 2023.
Alami Merrouni Zakariae et al.: "Automatic Keyphrase Extraction: A Survey and Trends", Journal of Intelligent Information Systems: Artificial Intelligence and Database Technologies, Kluwar Academic Publishers, Amsterdam, NL, vol. 54, No. 2, May 2, 2019, pp. 391-424, XP037064515, ISSN: 0925-9902, DOI: 10.1007/S10844-019-00558-9.

* cited by examiner

SYSTEMS AND METHODS RELATING TO MINING TOPICS IN CONVERSATIONS

BACKGROUND

The present invention generally relates to the field of customer relations management. More particularly, but not by way of limitation, the present invention relates to telecommunications systems in the field of customer relations management, including automating the mining of topics discussed in conversations between customers and customer service agents and the delivery of improved analytics related thereto and more efficient contact center operations.

BRIEF DESCRIPTION OF THE INVENTION

The present application describes a computer-implemented method related to mining topics discussed in conversations. The method may include: receiving, by a processor, conversation data that includes text derived from the conversations that occurred between a customer and agent; and using, by the processor, a topic mining algorithm to automatically mine topics from the conversations of the conversation data. The topic mining algorithm may include the step of identifying candidate topics in each of the conversations. When described in relation to an exemplary first conversation of the conversations, the step of identifying candidate topics may include: identifying utterances in the first conversation, wherein an utterance is defined as a turn within the first conversation in which the customer, in the form of a customer utterance, or the agent, in the form of an agent utterance, is communicating; tagging each word in the utterances with a part-of-speech (POS) tag; based on the POS tags, identifying keywords from the utterances, wherein a keyword is defined as a word having a POS tag indicating the word is one of a noun, adjective, and verb; using a graph-based ranking algorithm to determine a relative importance of the keywords in the first conversation and calculating a keyword importance score for each of the keywords according to the determined relative importance; identifying keyphrases in the first conversation, wherein the keyphrases are defined as the keywords in instances when the keywords appear consecutively; calculating a keyphrase importance score as a sum of the keyword importance scores for the keywords included within the keyphrase and determining a relative importance of each of the key phrases in the first conversation by comparing the calculated keyphrase importance scores; and selecting as candidate topics from the first conversation a predetermined number of the keyphrases having a highest keyphrase importance score. The topic mining algorithm may further include the step of identifying the topics of the conversations by: compiling a list of the candidate topics found in the conversations; pruning the list of candidate topics by discarding certain of the candidate topics in accordance with a cross-conversation factor that factors the candidate topics usage across all of the conversations; and identifying the candidate topics remaining on the pruned list of candidate topics as the topics. The topic mining algorithm may further include the step of determining topic groups by grouping the topics into the topic groups according to a degree of semantic similarity between the topics; and associating a list of utterances with the topic groups by compiling the utterances corresponding to the topics included within each of the topic group and associating the compiled utterances therewith.

These and other features of the present application will become more apparent upon review of the following detailed description of the example embodiments when taken in conjunction with the drawings and the appended claims.

BRIEF DESCRIPTION OF THE DRAWINGS

A more complete appreciation of the present invention will become more readily apparent as the invention becomes better understood by reference to the following detailed description when considered in conjunction with the accompanying drawings, in which like reference symbols indicate like components. The drawings include the following figures.

DETAILED DESCRIPTION

Figure 1:
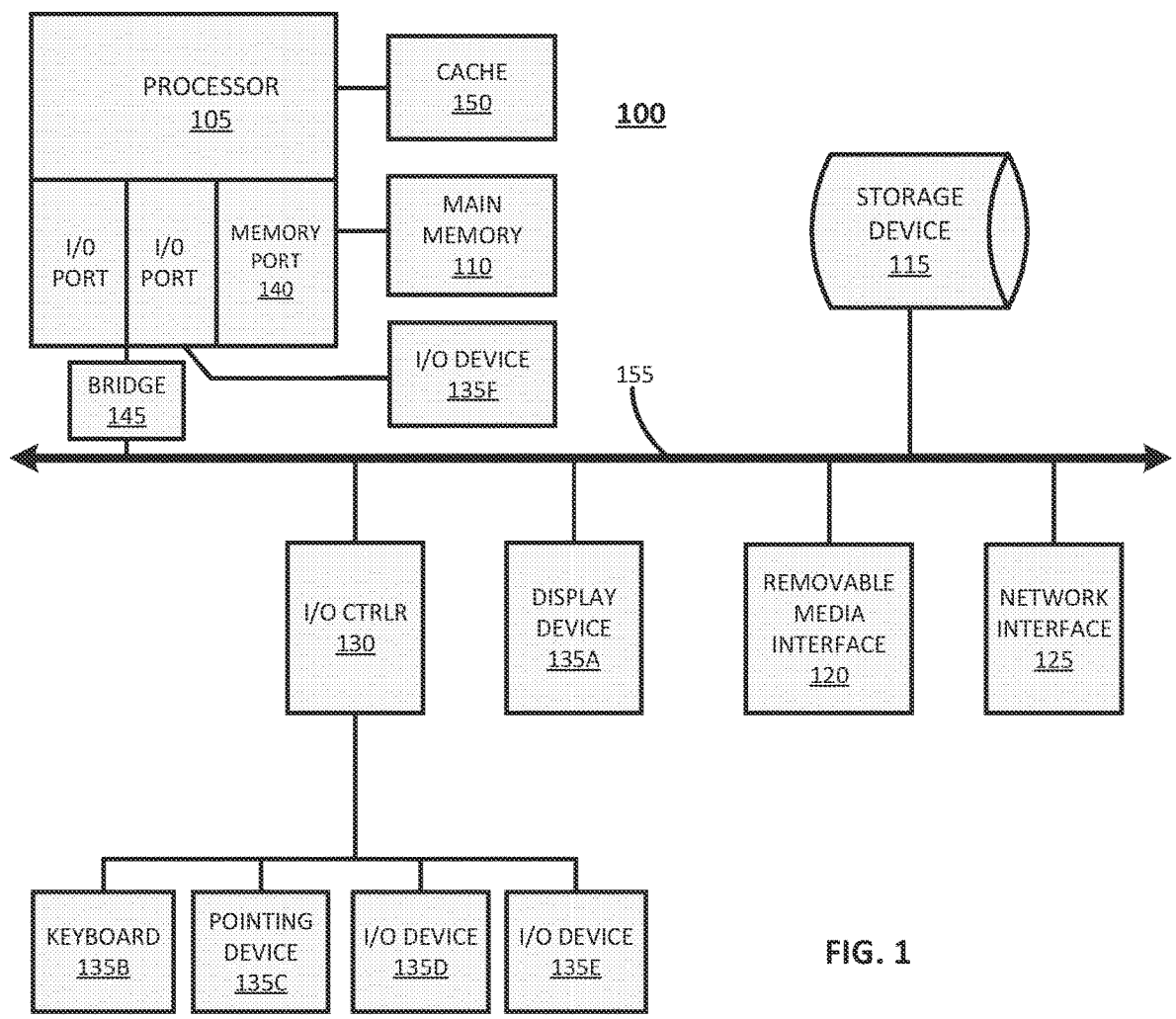
FIG. 1 depicts a schematic block diagram of a computing device in accordance with exemplary embodiments of the present invention and/or with which exemplary embodiments of the present invention may be enabled or practiced.

For the purposes of promoting an understanding of the principles of the invention, reference will now be made to the exemplary embodiments illustrated in the drawings and specific language will be used to describe the same. It will be apparent, however, to one having ordinary skill in the art that the detailed material provided in the examples may not be needed to practice the present invention. In other instances, well-known materials or methods have not been described in detail in order to avoid obscuring the present invention. As used herein, language designating nonlimiting examples and illustrations includes "e.g.", "i.e.", "for example", "for instance" and the like. Further, reference throughout this specification to "an embodiment", "one embodiment", "present embodiments", "exemplary embodiments", "certain embodiments" and the like means that a particular feature, structure or characteristic described in connection with the given example may be included in at least one embodiment of the present invention. Particular features, structures or characteristics may be combined in any suitable combinations and/or sub-combinations in one or more embodiments or examples. Those skilled in the art will recognize from the present disclosure that the various embodiments may be computer implemented using many different types of data processing equipment, with embodiments being implemented as an apparatus, method, or computer program product.

The flowcharts and block diagrams provided in the figures illustrate architecture, functionality, and operation of possible implementations of systems, methods, and computer program products in accordance with example embodiments of the present invention. In this regard, it will be understood that each block of the flowcharts and/or block diagrams—or combinations of those blocks—may represent a module, segment, or portion of program code having one or more executable instructions for implementing the specified logical functions. It will similarly be understood that each of block of the flowcharts and/or block diagrams—or combinations of those blocks—may be implemented by special purpose hardware-based systems or combinations of special purpose hardware and computer instructions performing the specified acts or functions. Such computer program instructions also may be stored in a computer-readable medium that can direct a computer or other programmable data processing apparatus to function in a particular manner, such that the program instructions in the computer-readable medium produces an article of manufacture that includes instructions by which the functions or acts specified in each block of the flowcharts and/or block diagrams—or combinations of those blocks—are implemented.

Computing Device

The systems and methods of the present invention may be computer implemented using many different forms of data processing equipment, for example, digital microprocessors and associated memory, executing appropriate software programs. By way of background, FIG. 1 illustrates a schematic block diagram of an exemplary computing device 100 in accordance with embodiments of the present invention and/or with which those embodiments may be enabled or practiced. It should be understood that FIG. 1 is provided as a non-limiting example.

The computing device 100, for example, may be implemented via firmware (e.g., an application-specific integrated circuit), hardware, or a combination of software, firmware, and hardware. It will be appreciated that each of the servers, controllers, switches, gateways, engines, and/or modules in the following figures (which collectively may be referred to as servers or modules) may be implemented via one or more of the computing devices 100. As an example, the various servers may be a process running on one or more processors of one or more computing devices 100, which may be executing computer program instructions and interacting with other systems or modules in order to perform the various functionalities described herein. Unless otherwise specifically limited, the functionality described in relation to a plurality of computing devices may be integrated into a single computing device, or the various functionalities described in relation to a single computing device may be distributed across several computing devices. Further, in relation to any of the computing systems described herein, the various servers and computer devices may be located on computing devices 100 that are local (i.e., on-site) or remote (i.e., off-site or in a cloud computing environment), or some combination thereof.

As shown in the illustrated example, the computing device 100 may include a central processing unit (CPU) or processor 105 and a main memory 110. The computing device 100 may also include a storage device 115, removable media interface 120, network interface 125, I/O controller 130, and one or more input/output (I/O) devices 135, which as depicted may include an, display device 135A, keyboard 135B, and pointing device 135C. The computing device 100 further may include additional elements, such as a memory port 140, a bridge 145, I/O ports, one or more additional input/output devices 135D, 135E, 135F, and a cache memory 150 in communication with the processor 105.

The processor 105 may be any logic circuitry that responds to and processes instructions fetched from the main memory 110. For example, the process 105 may be implemented by an integrated circuit, e.g., a microprocessor, microcontroller, or graphics processing unit, or in a field-programmable gate array or application-specific integrated circuit. As depicted, the processor 105 may communicate directly with the cache memory 150 via a secondary bus or backside bus. The main memory 110 may be one or more memory chips capable of storing data and allowing stored data to be directly accessed by the central processing unit 105. The storage device 115 may provide storage for an operating system. Unless otherwise limited, the computing device 100 may include an operating system and software capable of performing the functionality described herein.

As depicted in the illustrated example, the computing device 100 may include a wide variety of I/O devices 135, one or more of which may be connected via the I/O controller 130. Input devices, for example, may include a keyboard 135B and a pointing device 135C, e.g., a mouse or optical pen. Output devices, for example, may include video display devices, speakers, and printers. The computing device 100 may also support one or more removable media interfaces 120. More generally, the I/O devices 135 may include any conventional devices for performing the functionality described herein.

Unless otherwise restricted, the computing device 100 may be any workstation, desktop computer, laptop or notebook computer, server machine, virtualized machine, mobile or smart phone, portable telecommunication device, or any other type of computing device, without limitation, capable of performing the functionality described herein. The computing device 100 may include a plurality of devices and resources connected by a network. As used herein, a network includes one or more computing devices, machines, clients, client nodes, client machines, client computers, endpoints, or endpoint nodes in communication with one or more other such devices. The network may be a private or public switched telephone network (PSTN), wireless carrier network, local area network (LAN), private wide area network (WAN), public WAN such as the Internet, etc., with connections being established using communication protocols. More generally, it should be understood that, unless otherwise limited, the computing device 100 may communicate with other computing devices 100 via any type of network using any communication protocol. Further, the network may be a virtual network environment where various network components are virtualized. Other types of virtualization are also contemplated.

Contact Center Systems

Figure 2:
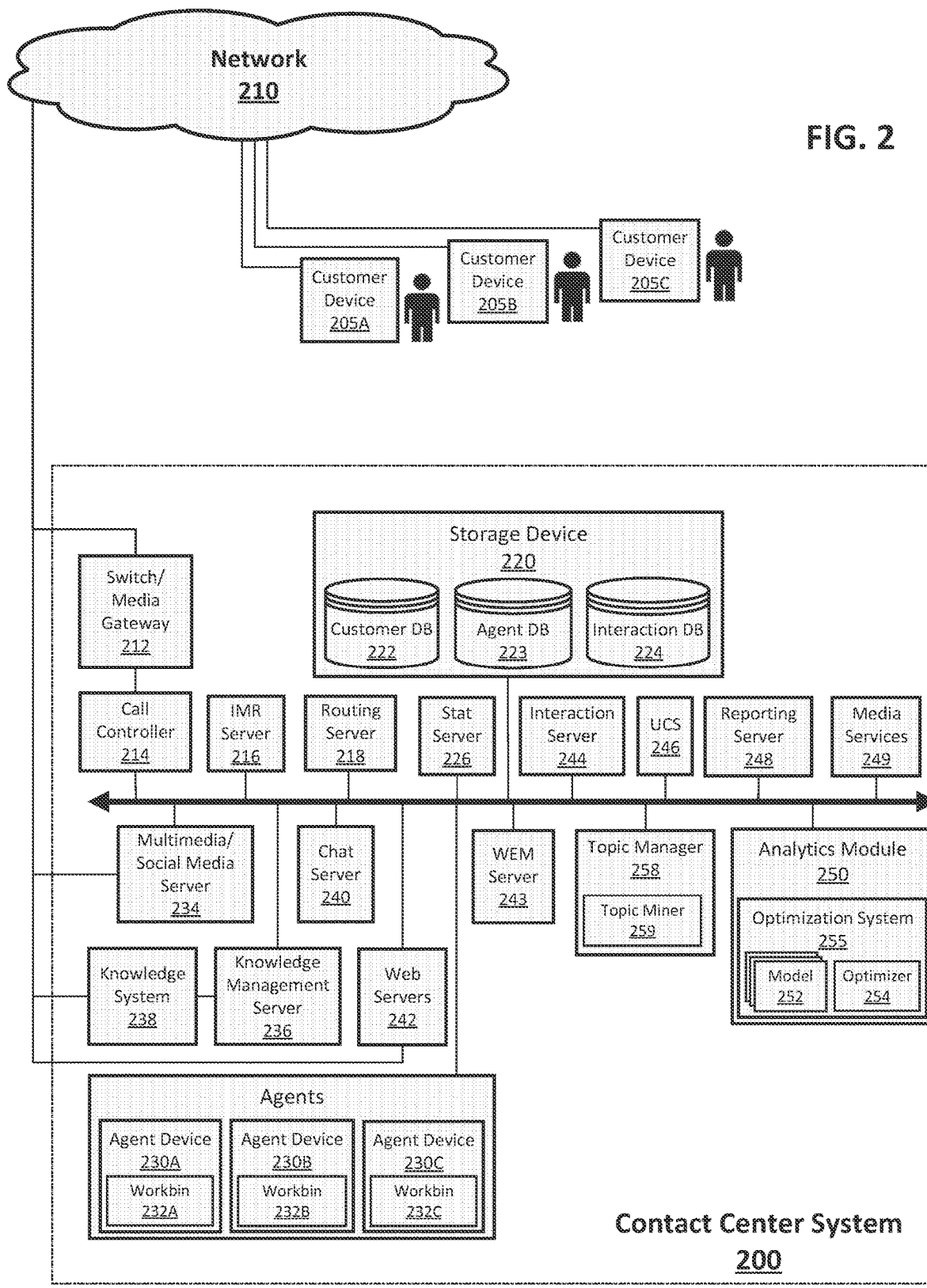
FIG. 2 depicts a schematic block diagram of a communications infrastructure or contact center in accordance with exemplary embodiments of the present invention and/or with which exemplary embodiments of the present invention may be enabled or practiced.

With reference now to FIG. 2, a communications infrastructure or contact center system 200 is shown in accordance with exemplary embodiments of the present invention and/or with which exemplary embodiments of the present invention may be enabled or practiced. It should be understood that the term "contact center system" is used herein to refer to the system depicted in FIG. 2 and/or the components thereof, while the term "contact center" is used more generally to refer to contact center systems, customer service providers operating those systems, and/or the organizations or enterprises associated therewith. Thus, unless otherwise specifically limited, the term "contact center" refers generally to a contact center system (such as the contact center system 200), the associated customer service provider (such as a particular customer service provider providing customer services through the contact center system 200), and/or the organization or enterprise on behalf of which those customer services are being provided.

By way of background, customer service providers generally offer many types of services through contact centers. Such contact centers may be staffed with employees or customer service agents (or simply "agents"), with the agents serving as an interface between a company, enterprise, government agency, or organization (hereinafter referred to interchangeably as an "organization" or "enterprise") and persons, such as users, individuals, or customers (hereinafter referred to interchangeably as "individuals" or "customers"). For example, the agents at a contact center may receive customer orders, solve customer problems with products or services already received, or assist customers in making purchasing decisions. Within a contact center, such interactions between contact center agents and outside entities or customers may be conducted over a variety of communication channels, such as, for example, via voice (e.g., telephone calls or voice over IP or VoIP calls), video (e.g., video conferencing), text (e.g., emails and text chat), screen sharing, co-browsing, or the like.

Referring specifically to FIG. 2, contact centers generally strive to provide quality services to customers while minimizing costs. Contact centers may include many different systems and modules—such as those shown in exemplary contact center system 200—in furtherance of this aim. The contact center system 200 may be used to engage and manage interactions in which automated processes (or bots) or human agents communicate with customers. As should be understood, the contact center system 200 may be an in-house facility to a business or enterprise for performing the functions of sales and customer service relative to its. In another aspect, the contact center system 200 may be operated by a third-party service provider that contracts to provide services for another organization. Further, the contact center system 200 may be deployed on equipment dedicated to the enterprise or third-party service provider, and/or deployed in a remote computing environment such as, for example, a private or public cloud environment. The contact center system 200 may include software applications or programs executed on premises and/or remotely. The various components of the contact center system 200, thus, may be distributed across various geographic locations and/or housed locally.

Unless otherwise specifically limited, any of the computing elements of the present invention may be implemented in cloud-based or cloud computing environments. As used herein, "cloud computing"—or, simply, the "cloud"—is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. Cloud computing can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Often referred to as a "serverless architecture", a cloud execution model generally includes a service provider dynamically managing an allocation and provisioning of remote servers for achieving a desired functionality.

In accordance with FIG. 2, the components or modules of the contact center system 200 may include: a plurality of customer devices 205A, 205B, 205C; communications network (or simply "network") 210; switch/media gateway 212; call controller 214; interactive media response (IMR) server 216; routing server 218; storage device 220; statistics (or "stat") server 226; plurality of agent devices 230A, 230B, 230C that include workbins 232A, 232B, 232C, respectively; multimedia/social media server 234; knowledge management server 236 coupled to a knowledge system 238; chat server 240; web servers 242; workforce engagement management ("WEM") server 243; interaction server 244; universal contact server (or "UCS") 246; reporting server 248; media services server 249; an analytics module 250; and a topic manager module (or "topic manager") 258. Any of the computer-implemented components, modules, or servers described in relation to FIG. 2 or in any of the following figures may be implemented via any type of computing devices, including the example computing device 100 of FIG. 1. As will be seen, the contact center system 200 generally manages resources (e.g., personnel, computers, telecommunication equipment, etc.) to enable delivery of services via telephone, email, chat, or other communication mechanisms. Such services may vary depending on the type of contact center and, for example, may include customer service, help desk functionality, emergency response, telemarketing, order taking, and the like.

Customers desiring to receive services from the contact center system 200 may initiate inbound communications (e.g., telephone calls, emails, chats, etc.) to the contact center system 200 via a customer device 205. While FIG. 2 shows three such customer devices—i.e., customer devices 205A, 205B, and 205C—any number may be present. The customer devices 205, for example, may be a communication device, such as a telephone, smart phone, computer, tablet, or laptop. In accordance with functionality described herein, customers may generally use the customer devices 205 to initiate, manage, and conduct communications with the contact center system 200, such as telephone calls, emails, chats, text messages, and the like.

Inbound and outbound communications from and to the customer devices 205 may traverse the network 210, with the nature of network typically depending on the type of customer device being used and form of communication. As an example, the network 210 may include a communication network of telephone, cellular, and/or data services. The network 210 may be a private or public switched telephone network (PSTN), local area network (LAN), private wide area network (WAN), and/or public WAN such as the Internet. Further, the network 210 may include any wireless carrier network.

In regard to the switch/media gateway 212, it may be coupled to the network 210 for receiving and transmitting telephone calls between customers and the contact center system 200. The switch/media gateway 212 may include a telephone or communication switch configured to function as a central switch for agent level routing within the center. The switch may be a hardware switching system or implemented via software. For example, the switch 215 may include an automatic call distributor, a private branch exchange (PBX), an IP-based software switch, and/or any other switch with specialized hardware and software configured to receive Internet-sourced interactions and/or telephone network-sourced interactions from a customer, and route those interactions to, for example, one of the agent devices 230. Thus, in general, the switch/media gateway 212 establishes a voice connection between the customer and the agent by establishing a connection between the customer device 205 and agent device 230. As further shown, the switch/media gateway 212 may be coupled to the call controller 214 which, for example, serves as an adapter or interface between the switch and the other routing, monitoring, and communication-handling components of the contact center system 200. The call controller 214 may be configured to process PSTN calls, VoIP calls, etc. For example, the call controller 214 may include computer-telephone integration (CTI) software for interfacing with the switch/media gateway and other components. The call controller 214 may include a session initiation protocol (SIP) server for processing SIP calls. The call controller 214 may also extract data about an incoming interaction, such as the customer's telephone number, IP address, or email address, and then communicate these with other contact center components in processing the interaction.

In regard to the interactive media response (IMR) server 216, it may be configured to enable self-help or virtual assistant functionality. Specifically, the IMR server 216 may be similar to an interactive voice response (IVR) server, except that the IMR server 216 is not restricted to voice and may also cover a variety of media channels. In an example illustrating voice, the IMR server 216 may be configured with an IMR script for querying customers on their needs. For example, a contact center for a bank may tell customers via the IMR script to "press 1" if they wish to retrieve their account balance. Through continued interaction with the IMR server 216, customers may receive service without needing to speak with an agent. The IMR server 216 may also be configured to ascertain why a customer is contacting the contact center so that the communication may be routed to the appropriate resource.

In regard to the router or routing server 218, it may function to route incoming interactions. The routing server 218 may perform predictive routing whereby incoming interactions are routed to resources calculated to deliver the best result for the customer and/or contact center. For example, functionality within the routing server 218 may select the most appropriate agent and route the communication thereto. The agent selection may be based on which available agent is best suited for handling the communication. More specifically, the selection of appropriate agent may be based on a routing strategy or algorithm that is implemented by the routing server 218. In doing this, the routing server 218 may query data that is relevant to the incoming interaction, for example, data relating to the particular customer, available agents, and the type of interaction, which, as described more below, may be stored in particular databases. Once the agent is selected, the routing server 218 may interact with the call controller 214 to route (i.e., connect) the incoming interaction to the corresponding agent device 230. As part of this connection, information about the customer may be provided to the selected agent via their agent device 230. This information is intended to enhance the service the agent provides to the customer.

Regarding data storage, the contact center system 200 may include one or more mass storage devices—represented generally by the storage device 220—for storing data relevant to the functioning of the contact center. For example, the storage device 220 may store customer data that is maintained in a customer database 222. Such customer data may include customer profiles, contact information, service level agreement (SLA), and interaction history (e.g., details of previous interactions with a particular customer, including the nature of previous interactions, disposition data, wait time, handle time, and actions taken by the contact center to resolve customer issues). As another example, the storage device 220 may store agent data in an agent database 223. Agent data maintained by the contact center system 200 may include agent availability and agent profiles, schedules, skills, handle time, etc. As another example, the storage device 220 may store interaction data in an interaction database 224. Interaction data may include data relating to numerous past interactions between customers and contact centers. More generally, it should be understood that, unless otherwise specified, the storage device 220 may be configured to include databases and/or store data related to any of the types of information described herein, with those databases and/or data being accessible to the other modules or servers of the contact center system 200 in ways that facilitate the functionality described herein. For example, the servers or modules of the contact center system 200 may query such databases to retrieve data stored therewithin or transmit data thereto for storage. The storage device 220, for example, may take the form of any conventional storage medium and may be locally housed or operated from a remote location.

In regard to the stat server 226, it may be configured to record and aggregate data relating to the performance and operational aspects of the contact center system 200. Such information may be compiled by the stat server 226 and made available to other servers and modules, such as the reporting server 248, which then may use the data to produce reports that are used to manage operational aspects of the contact center and execute automated actions in accordance with functionality described herein. Such data may relate to the state of contact center resources, e.g., average wait time, abandonment rate, agent occupancy, and others, as functionality described herein would require.

The agent devices 230 of the contact center 200 may be communication devices configured to interact with the various components and modules of the contact center system 200 in ways that facilitate functionality described herein. An agent device 230 may further include a computing device configured to communicate with the servers of the contact center system 200, perform data processing associated with operations, and interface with customers via voice, chat, email, and other multimedia communication mechanisms according to functionality described herein. While FIG. 2 shows three such agent devices 230, any number may be present.

In regard to the multimedia/social media server 234, it may be configured to facilitate media interactions (other than voice) with the customer devices 205 and/or the web servers 242. Such media interactions may be related, for example, to email, voice mail, chat, video, text-messaging, web, social media, co-browsing, etc. The multi-media/social media server 234 may take the form of any IP router conventional in the art with specialized hardware and software for receiving, processing, and forwarding multi-media events and communications.

In regard to the knowledge management server 234, it may be configured to facilitate interactions between customers and the knowledge system 238. In general, the knowledge system 238 may be a computer system capable of receiving questions or queries and providing answers in response. The knowledge system 238 may be included as part of the contact center system 200 or operated remotely by a third party. The knowledge system 238 may include an artificially intelligent computer system capable of answering questions posed in natural language by retrieving information from information sources such as encyclopedias, dictionaries, newswire articles, literary works, or other documents submitted to the knowledge system 238 as reference materials, as is known in the art.

In regard to the chat server 240, it may be configured to conduct, orchestrate, and manage electronic chat communications with customers. In general, the chat server 240 is configured to implement and maintain chat conversations and generate chat transcripts. Such chat communications may be conducted by the chat server 240 in such a way that a customer communicates with automated chatbots, human agents, or both. In exemplary embodiments, the chat server 240 may perform as a chat orchestration server that dispatches chat conversations among the chatbots and available human agents. In such cases, the processing logic of the chat server 240 may be rules driven so to leverage an intelligent workload distribution among available chat resources. The chat server 240 further may implement, manage and facilitate user interfaces (also UIs) associated with the chat feature, including those UIs generated at either the customer device 205 or the agent device 230. The chat server 240 may be configured to transfer chats within a single chat session with a particular customer between automated and human sources such that, for example, a chat session transfers from a chatbot to a human agent or from a human agent to a chatbot. The chat server 240 may also be coupled to the knowledge management server 234 and the knowledge systems 238 for receiving suggestions and answers to queries posed by customers during a chat so that, for example, links to relevant articles can be provided.

In regard to the web servers 242, such servers may be included to provide site hosts for a variety of social interaction sites to which customers subscribe, such as Facebook, Twitter, Instagram, etc. Though depicted as part of the contact center system 200, it should be understood that the web servers 242 may be provided by third parties and/or maintained remotely. The web servers 242 may also provide webpages for the enterprise or organization being supported by the contact center system 200. For example, customers may browse the webpages and receive information about the products and services of a particular enterprise. Within such enterprise webpages, mechanisms may be provided for initiating an interaction with the contact center system 200, for example, via web chat, voice, or email. An example of such a mechanism is a widget, which can be deployed on the webpages or websites hosted on the web servers 242. As used herein, a widget refers to a user interface component that performs a particular function. In some implementations, a widget may include a graphical user interface control that can be overlaid on a webpage displayed to a customer via the Internet. The widget may show information, such as in a window or text box, or include buttons or other controls that allow the customer to access certain functionalities, such as sharing or opening a file or initiating a communication. In some implementations, a widget includes a user interface component having a portable portion of code that can be installed and executed within a separate webpage without compilation. Some widgets can include corresponding or additional user interfaces and be configured to access a variety of local resources (e.g., a calendar or contact information on the customer device) or remote resources via network (e.g., instant messaging, electronic mail, or social networking updates).

In regard to the WEM server 243, it may be configured to host and enable a suite of features focused on improving employee engagement in contact centers, which may be referred to broadly as "workforce engagement management" (or "WEM"). The WEM server 243 may provide solutions that simplify the agent experience and help drive results and employee satisfaction. The WEM server 243 may include capabilities such as call recording, screen recording, quality management, performance management, speech and text analytics, gamification, as well as capabilities related to workforce management (or "WFM") and workforce optimization ("WFO"). In general, WFM makes sure that the right resource is there at the right time for service, while WFO provides the ability to monitor and act upon the content of the interactions via quality management and interaction analytics. In addition to those functions, WEM further ensures that the prerequisites for enabling contact center to provide effective customer service over the long-term by engaging the agents who provide the service. In doing this, the WEM server 243 may provide functionality aimed at allowing contact centers to improve metrics related to employee recognition, churn, and development. Further, WEM recognizes a shift within the contact center industry from focusing on optimizing labor productivity and managing labor costs—i.e., workforce optimization—to a more employee-centric focus that engages agents throughout the employment life cycle. WEM applications are designed to increase agent engagement by automating tasks associated with scheduling, coaching, quality management, performance management and more. More specifically, the WEM server 243 may include core applications such as recording interactions across all channels, quality monitoring with automated scoring, workforce management with AI-infused scheduling and forecasting, performance management, speech and data analytics, and others. The WEM server 243 may further provide features such as gamification, robotic process automation, voice authentication, predictive analytics, chatbots, customer engagement hub, tools for building custom applications, and AI and analytics. For example, AI-infused algorithms can prepare more accurate agent schedules, customer insights, routing, etc., which consider more variables and have greater predictive power. Further, much of the tedious labor involved in quality monitoring can be automated, which saves time and money and improves agent morale. Other functionality may include any of the related features described herein as would be understood and enabled by one of ordinary skill in the art. Such enablement may include connections with any of the other servers, devices and data sources described herein.

In regard to the interaction server 244, it may be configured to manage deferrable activities of the contact center and the routing thereof to human agents for completion. As used herein, deferrable activities include back-office work that can be performed off-line, e.g., responding to emails, attending training, and other activities that do not entail real-time communication with a customer. As an example, the interaction server 244 may be configured to interact with the routing server 218 for selecting an appropriate agent to handle each of the deferable activities. Once assigned to a particular agent, the deferable activity is pushed to that agent so that it appears on the agent device 230 of the selected agent. The deferable activity may appear in a workbin 232 as a task for the selected agent to complete. The functionality of the workbin 232 may be implemented via any conventional data structure, such as, for example, a linked list, array, etc. Each of the agent devices 230 may include a workbin 232, with the workbins 232A, 232B, and 232C being maintained in the agent devices 230A, 230B, and 230C, respectively. As an example, a workbin 232 may be maintained in the buffer memory of the corresponding agent device 230.

In regard to the universal contact server (UCS) 246, it may be configured to retrieve information stored in the customer database 222 and/or transmit information thereto for storage therein. For example, the UCS 246 may be utilized as part of the chat feature to facilitate maintaining a history on how chats with a particular customer were handled, which then may be used as a reference for how future chats should be handled. More generally, the UCS 246 may be configured to facilitate maintaining a history of customer preferences, such as preferred media channels and best times to contact. To do this, the UCS 246 may be configured to identify data pertinent to the interaction history for each customer such as, for example, data related to comments from agents, customer communication history, and the like. Each of these data types then may be stored in the customer database 222 or on other modules and retrieved as functionality described herein requires.

In regard to the reporting server 248, it may be configured to generate reports from data compiled and aggregated by the statistics server 226 or other sources. Such reports may include near real-time reports or historical reports and concern the state of contact center resources and performance characteristics, such as, for example, average wait time, abandonment rate, agent occupancy. The reports may be generated automatically or in response to specific requests from a requestor (e.g., agent, administrator, contact center application, etc.). The reports then may be used toward managing the contact center operations in accordance with functionality described herein.

In regard to the media services server 249, it may be configured to provide audio and/or video services to support contact center features. In accordance with functionality described herein, such features may include prompts for an IVR or IMR system (e.g., playback of audio files), hold music, voicemails/single party recordings, multi-party recordings (e.g., of audio and/or video calls), speech recognition, dual tone multi frequency (DTMF) recognition, faxes, audio and video transcoding, secure real-time transport protocol (SRTP), audio conferencing, video conferencing, coaching (e.g., support for a coach to listen in on an interaction between a customer and an agent and for the coach to provide comments to the agent without the customer hearing the comments), call analysis, keyword spotting, and the like.

In regard to the analytics module 250, it may be configured to provide systems and methods for performing analytics on data received from a plurality of different data sources as functionality described herein may require. In accordance with example embodiments, the analytics module 250 also may generate, update, train, and modify predictors or models 252 based on collected data, such as, for example, customer data, agent data, and interaction data. The models 252 may include behavior models of customers or agents. The behavior models may be used to predict behaviors of, for example, customers or agents, in a variety of situations, thereby allowing embodiments of the present invention to tailor interactions based on such predictions or to allocate resources in preparation for predicted characteristics of future interactions, thereby improving overall contact center performance and the customer experience. It will be appreciated that, while the analytics module 250 is depicted as being part of a contact center, such behavior models also may be implemented on customer systems (or, as also used herein, on the "customer-side" of the interaction) and used for the benefit of customers.

According to exemplary embodiments, the analytics module 250 may have access to the data stored in the storage device 220, including the customer database 222 and agent database 223. The analytics module 250 also may have access to the interaction database 224, which stores data related to interactions and interaction content (e.g., transcripts of the interactions and events detected therein), interaction metadata (e.g., customer identifier, agent identifier, medium of interaction, length of interaction, interaction start and end time, department, tagged categories), and the application setting (e.g., the interaction path through the contact center). Further, as discussed more below, the analytic module 250 may be configured to retrieve data stored within the storage device 220 for use in developing and training algorithms and models 252, for example, by applying machine learning techniques.

One or more of the included models 252 may be configured to predict customer or agent behavior and/or aspects related to contact center operation and performance. Further, one or more of the models 252 may be used in natural language processing and, for example, include intent recognition and the like. The models 252 may be developed based upon 1) known first principle equations describing a system, 2) data, resulting in an empirical model, or 3) a combination of known first principle equations and data. In developing a model for use with present embodiments, because first principles equations are often not available or easily derived, it may be generally preferred to build an empirical model based upon collected and stored data. To properly capture the relationship between the manipulated/disturbance variables and the controlled variables of complex systems, it may be preferable that the models 252 are nonlinear. This is because nonlinear models can represent curved rather than straight-line relationships between manipulated/disturbance variables and controlled variables, which are common to complex systems such as those discussed herein. Given the foregoing requirements, a machine learning or neural network-based approach is presently a preferred embodiment for implementing the models 252. Neural networks, for example, may be developed based upon empirical data using advanced regression algorithms.

The analytics module 250 may further include an optimizer 254. As will be appreciated, an optimizer may be used to minimize a "cost function" subject to a set of constraints, where the cost function is a mathematical representation of desired objectives or system operation. Because the models 252 may be non-linear, the optimizer 254 may be a nonlinear programming optimizer. It is contemplated, however, that the present invention may be implemented by using, individually or in combination, a variety of different types of optimization approaches, including, but not limited to, linear programming, quadratic programming, mixed integer nonlinear programming, stochastic programming, global nonlinear programming, genetic algorithms, particle/swarm techniques, and the like.

According to exemplary embodiments, the models 252 and the optimizer 254 may together be used within an optimization system 255. For example, the analytics module 250 may utilize the optimization system 255 as part of an optimization process by which aspects of contact center performance and operation are optimized or, at least, enhanced. This, for example, may include aspects related to the customer experience, agent experience, interaction routing, natural language processing, intent recognition, or other functionality related to automated processes.

In regard to the topic manager module (or "topic manager") 258, this component is configured to mine topics, such as with a topic miner module (or "topic miner") 259, from interactions and provide analysis and other functionality in relation to those mined topics. As discussed in more detail below, the topic manager 258 accomplishes this by orchestrating other components, servers, and modules of a contact center and the data related thereto, such as those components, servers, and modules described above in relation to the example contact center system 200, so to provide the functionality described herein, as would be understood by one of ordinary skill in the art. The topic manager 258 may provide such functionality as part of a suite of features associated with the WEM server 243. Alternatively, the topic manager 258 may be a stand alone features.

The various components, modules, and/or servers of FIG. 2—as well as those of the other figures included herein—may each include one or more processors executing computer program instructions and interacting with other system components for performing the various functionalities described herein. Such computer program instructions may be stored in a memory implemented using a standard memory device. Although the functionality of each of the servers is described as being provided by the particular server, it should be recognized that the functionality of various servers may be combined or integrated into a single server, or the functionality of a particular server may be distributed across one or more other servers. Further, the terms "interaction" and "communication" are used interchangeably, and generally refer to any real-time and non-real-time interaction that uses any communication channel of the contact center. Access to and control of the components of the contact system 200 may be affected through user interfaces (UIs) that may be generated on the customer devices 205 and/or the agent devices 230.

Figure 3:
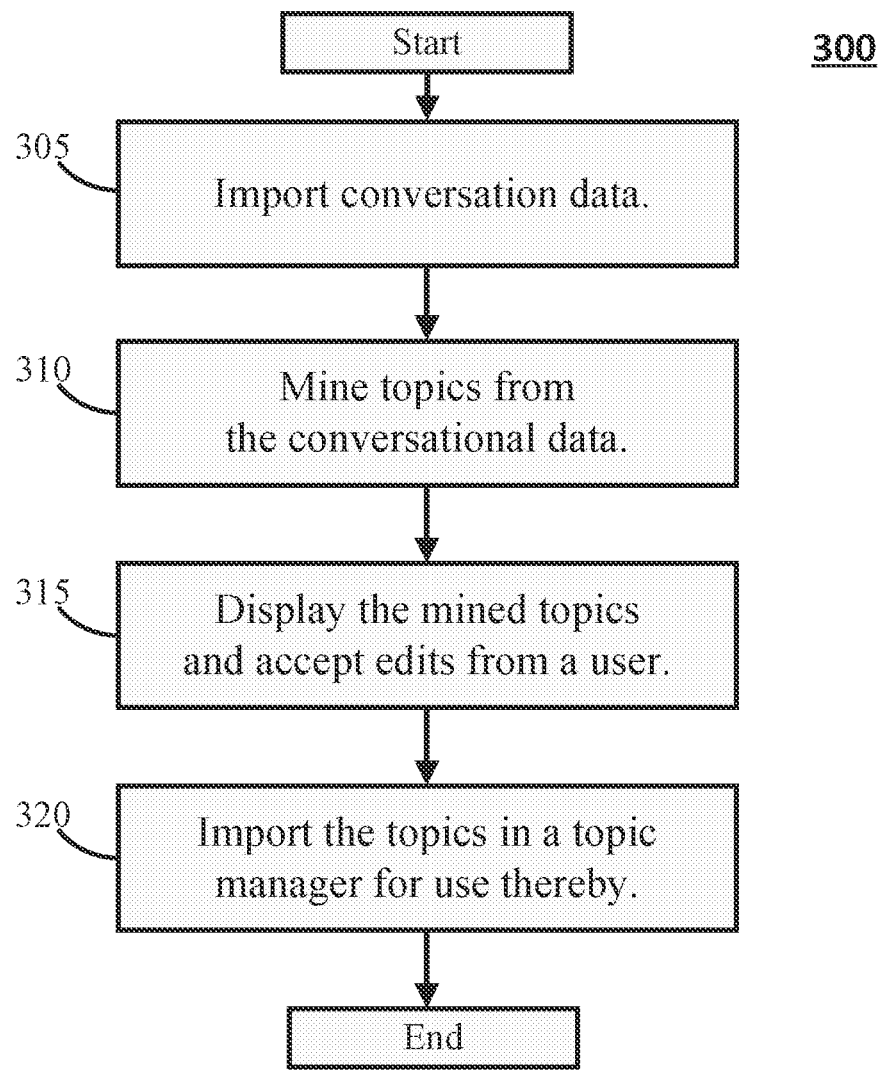
FIG. 3 is a topic mining workflow in accordance with an exemplary embodiment of the present invention.
Figure 4:
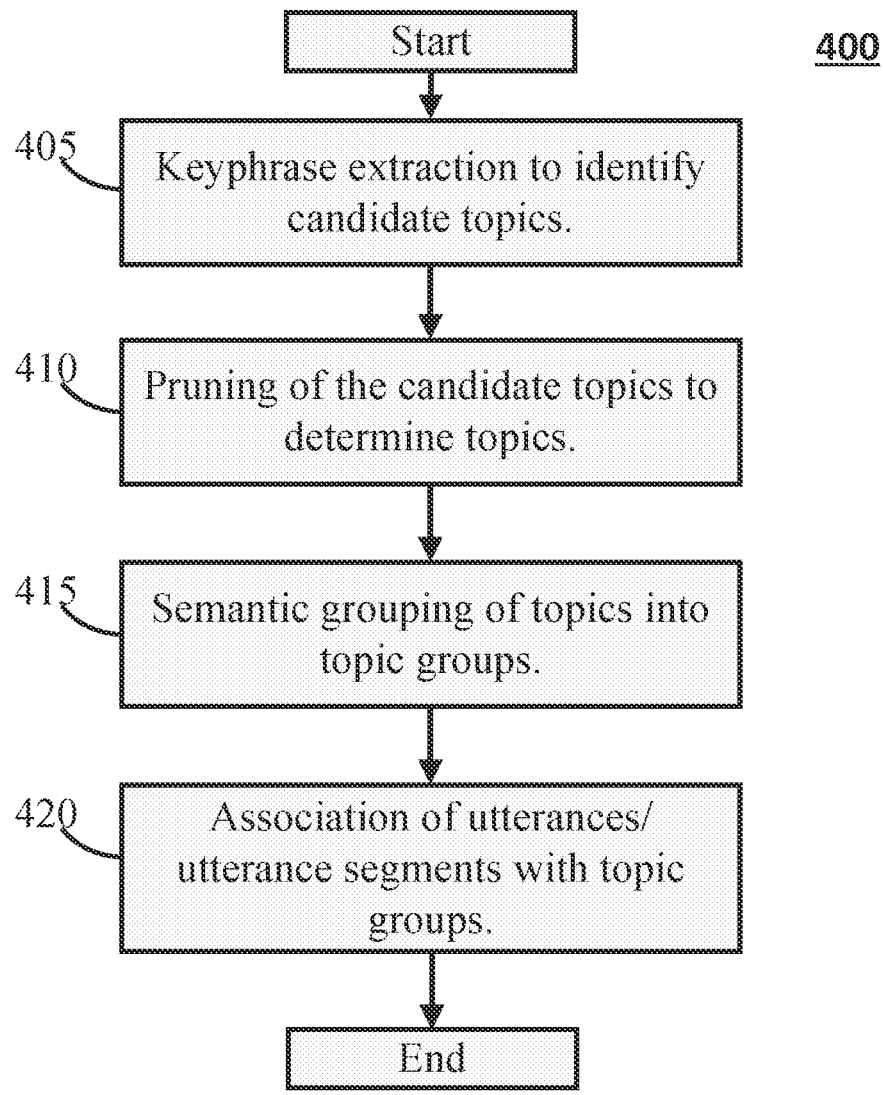
FIG. 4 is an exemplary flowchart for a topic mining algorithm in accordance with an exemplary embodiment of the present invention.

Turning now to FIGS. 3-4, the functionality of the topic manager 259 will now be presented in accordance with example embodiments of the present invention. Before proceeding with this, though, some background as to how contact centers function will be provided while also highlighting some operational shortcomings that the present invention addresses.

With businesses investing ever more in improving customer experience, an increasing number of conversations occur between contact center agents and customers on a daily basis. For businesses, a primary goal is to understand the nature of the conversations. For example, this allows the business to better appreciate major areas of frustrations, or "pain points", experienced by its customers. Such an understanding can be critical in improving customer satisfaction, which helps to improve customer retention and, ultimately, profits. As such, it will be appreciated that gaining insights into the millions of conversations happening in contact centers represents a critical component in understanding customer issues. One way to do this is through analytics that identify and track topics covered in such conversations. Such analytics can be used to provide insights into trending customer issues so that corrective action can be taken in a timely manner. This type of data is a valuable source of information to businesses, as it can enable improvements in customer satisfaction, compliance, and reduce agent load.

As used therein, the term "topic" refers to the major themes or subject matter covered in a conversation, such as a conversation occurring between a customer and agent or other resources (for example, automated resource or bot) in a contact center. Identification of these topics in historical conversations and analysis as to how such topics change and trend allow businesses to understand how customer issues change over time and identify emerging issues and opportunities. This type of information may also be used to effectively train agents. Further, real-time spotting of topics within an ongoing conversation can enable a contact center to better assist agents in solving customer issues. For example, question-answering systems may be trained to provide answers to questions when particular topics are spotted. Additionally, systems may be designed to notify agent supervisors when certain topics are spotted and inform in real-time as to necessary corrected actions to take.

Various systems exist that identify topics from documents, but systems that mine topics from the multitude of conversations occurring in a contact center in real-time and/or deliver the type of analytics and solutions described herein are not available in the art. One reason for this is that the conversations being analyzed are often nuanced and challenging to decipher. This is because each conversation involves multiple parties (i.e., at least an agent and a customer) and the data is not a set of text documents, but a occurs over a series of turns (voice or text) between agents and customers, which are often ill-defined and overlapping. However, the challenge is a worthwhile one, because once topics are mined from such conversations, the information can be used in plethora of scenarios to enhance customer satisfaction, agent performance, and contact center operations. The mined topics can be used to visualize trends in conversation topics, for example, as part of a topic dashboard component of an operations dashboard in a contact center. Further, the mined topic can be used to train machine learning models to more effectively spot topics in historical and real-time conversations.

As will be appreciated, a topic manager module of the present invention, e.g., the topic manager 258 of FIG. 2, may provide several types of functionality, including topic mining, analytics related to mined topics, model training, and reporting features, which may be taken in response to the mined topics and analytics. Such functionality may be incorporated into the WEM server 243 or provided as a separate feature. In accordance with exemplary embodiments, as new topics are identified, the topic manager 258 may notify a user (such as a supervisor, manager, or other designated employee) and prompt the user to create or approve a new topic in the system. The user also may add training utterances to the topic. In conventional systems, this represents a time-consuming process—spanning days or even weeks—but given the automation provided by the topic manager 258 and topic miner 259 of the present invention, this process can be conveniently and efficiently completed. As will be seen, the topic miner 259 may mine tens of thousands of historical conversations and identify the significant topics covered therein. The topic miner 258 also mines the utterances that signal the topics. The utterances then can be exported into the topic manager for use thereby. This type of automation may significantly reduce the overall time needed for managing topics in a contact center setting.

With reference now to FIG. 3, various stages or steps of a topic mining workflow 300 are shown in accordance with the present invention. To initiate the workflow 300, conversations, or more specifically, conversation data, may be imported for mining. Such conversation data may consist of previously occurring conversations between agents and customers. Such conversation data may be natural language conversations consisting of multiple back and forth messages or turns. The conversations may have occurred via multiple different channels. For example, the conversations may have occurred via a chat interface, through text, or via speech in voice calls. In the case of the latter, the conversations may be transcribed into text via speech recognition to produce the textual conversation data needed for topic mining.

Accordingly, at an initial step 305, the topic mining workflow 300 includes importing conversation data (i.e., conversational text data) for use in the topic mining process. This may be done in several ways. For example, the conversational data may be imported via a text file (in a supported format like JSON) containing the conversations to be mined. The conversational data also may be imported from cloud storage or streamed in real-time.

At a step 310, the topic mining workflow 300 may include mining the topics from the conversational data. As discussed in relation to FIG. 4 below, the topics may be mined in accordance with a topic mining algorithm.

At a step 315, the topic mining workflow 300 may include reviewing, editing, and testing the mined topics. This may include displaying the mined topics to a user and accepting input from the user related to approving or editing the topics. At this stage of the workflow, the user interacts with the mined output to make an necessary changes, which may include fine-tuning and pruning topics and associated utterances before exporting them into the topic manager module for use in spotting topics. The user may perform various actions on the mined output, such as, for example: selecting a topic and the utterances that belong to that topic; merging two or more topics into a single topic, which would result in the merger of their chosen utterances; splitting a topic into multiple topics, which would result in the splitting of corresponding utterances; and renaming topic labels. This process also may be automatedly driven by predetermined business logic. At the end of this process, a modified and/or approved set of topics and associated utterances (or, as will be seen, utterance-segments) is produced.

At a step 320, the topic mining workflow 300 may include importing the mined topics and associated utterances into a downstream application for use thereby. For example, the mined topics may be uploaded into other modules within the topic manager 258, which then may use the topics associated utterances to provide analytics and other functionality related thereto. Reporting functionality may provide the results of the analytics to a specified user. Additionally, the newly mined topics and associated utterances also may be used by the topic miner 259 to mine conversations occurring in real-time in the contact center.

With reference now to FIG. 4, an exemplary algorithm 400 for topic mining is shown in accordance with the present invention. As will be appreciated, the topic miner algorithm may be used by the topic miner 259 to mine topics from conversation data. As shown, this algorithm may be broken down into several steps, which will be referred to herein as: a) keyphrase extraction to identify candidate topics (step 405); b) pruning of the candidate topics to determine topics (step 410); c) semantic grouping of topics into topic groups (step 415); and d) association of utterances/utterance segments with topic groups (step 420). Other steps may be provided, such as masking personally identifiable information in the utterances. An additional step may further include the computation of certain analytics related to the mined data. Each of these steps will now be discussed in detail. As will be seen, the steps will be described in relation to imported conversation data, which, for example, includes data related to natural language conversations between customers interacting with customer service representatives or agents. It should be appreciated, however, that the process described herein may be applicable to other contexts involving other types of users and conversation types.

As stated, once the conversation data is imported, topics may be mined in accordance with a topic mining algorithm. An initial step of the topic mining algorithm is keyphrase extraction. Once extracted, the keyphrases may be referred to as candidate topics. As will be appreciated, a conversation typically consists of multiple message utterances or turns involving a plurality of parties, which may include an automated agent or bot, a live agent, and/or a customer. In accordance with an exemplary embodiment, all statement known to be produced by a bot may be deemed unimportant for the purposes of mining topics. Thus, statements identified as coming from a bot may be discarded. For example, a message generated by a bot might include the following: "Hello, thank you for contacting us. All chats may be monitored or recorded for quality and training purposes. We will be with you shortly to help you with your request". Such bot-generated messages tend to be generic and can be safely discarded because, as they do not provide any assistance in identifying conversational topics. The actual conversation may be deemed to begin when either the live agent or customer sends a message or communications. Of course, to the extent more sophisticated bots are able to interact in a more meaningful way with customers, the step of discarding such statements may itself be discarded.

The identification and extraction of keyphrases may continue with the statements or messages made in a conversation by an agent or a customer. Given the agent/customer turns in a conversation, a part-of-speech (POS) tag for each word may be obtained. This may include lemmatizing words to obtain tokens, which reduces different inflectional and other variations of a word to a common base form. Then only those words/tokens having POS tags corresponding to noun, adjective, and verb are selected, as these are deemed important for extracting topics. These selected words may be referred to as "keywords". The remaining, unselected words may be deemed as unimportant words and designated as "stopwords".

A graph-based ranking algorithm may then be used to obtain the relative importance of keywords in a conversation. As will be appreciated, such word graphs may be used to understand the co-occurrence relationship between the keywords of a conversation. As an example, a text rank algorithm (such as "TextRank") may be used to obtain a relevance or importance score for each keyword in a conversation. This score also may be referred to as a "keyword importance score". Keyphrases may be identified from the keywords. According to exemplary embodiments, keyphrases are defined as instances when the keywords appear consecutively. That is, keywords occurring consecutively in the conversation are identified as keyphrases. Consecutively occurring keywords may be concatenated together to obtain keyphrases. A relative importance for the keyphrases in the conversation may then be determined. In accordance with an exemplary embodiment, the text rank score of the keywords making up a keyphrase are summed to obtain an importance score. This score may be referred to as a "keyphrase importance score".

As an example, consider a customer turn that includes "credit card for the month of April." In this case, "credit", "card", "month" and "April" would be obtained as keywords, while "for", "the", and "of" would be marked as stopwords. Also, "credit card" would be obtained as a keyphrase since "credit" and "card" occur consecutively in the turn. The sum of text rank scores of "credit" and "card" would give an importance score for the "credit card" keyphrase. From each conversation, a predetermined number of keyphrases having the highest keyphrase importance score is then selected. For example, the top 5 keyphrases may be picked after sorting the keyphrases in descending order based on their keyphrase importance scores. As part of this process, the utterance (i.e., the words used in the turn in which the keyphrase is found) associated with each of the keyphrases is stored as metadata for later usage. This process is completed for each of the conversations. All the extracted keyphrases and associated metadata then may be stored in a database. The extracted keyphrases may be referred to at this stage in the process as "candidate topics".

A next step in the topic mining algorithm may include keyphrase or candidate topic pruning, which is done to identify topics. As will be appreciated, it is likely that many of the candidate topics obtained in the extraction process are repeated across multiple conversations. In accordance with exemplary embodiments, a list of candidate topics found in the conversations may be pruned by discarding certain of the candidate topics in accordance with a cross-conversation factor, which, as used herein, is a factor that considers the candidate topics usage across all of the conversations. For example, the keyphrase importance score for a given candidate topic may be updated by averaging its value across multiple or all of the conversations. Pruning may be based on this updated value. Another cross-conversation factor is a frequency of occurrence. The frequency of occurrence is a metric that values a candidate topic based on the frequency that it appears in conversations of the conversation data. According to example embodiments, candidate topics determined to have a frequency of occurrence that is less than a predetermined threshold are ignored or pruned. This may help to avoid noise by eliminating the extraction of spurious keyphrases during the extraction process. By pruning of the list of candidate topics in this way, the most dominant/relevant keyphrases present in a conversational dataset is more assuredly determined. The keyphrases (or candidate topics) that remain after the pruning may be designated as the topics identified in the conversation data.

A next step involves grouping the topics to determine topic groups. According to exemplary embodiments, the topics are group based on semantic similarity. As will be appreciated, it is likely that many of the identified topics are semantically similar and can be combined to make the number of topics more manageable. While morphologically similar topics, such as "credit card" and "credit card bill", may be grouped easily using traditional NLP techniques, grouping of semantically similar but morphologically different topics is more difficult. For example, the grouping of "fraudulent charges" and "unknown transaction" is more difficult to achieve. Thus, in this step, deep learning techniques related to word embedding generation may be employed. In exemplary embodiments, the process may include the following steps.

First, for each topic, an embedding is computed. An embedding is an efficient representation of text, be it a word, phrase, sentence, or paragraph, where semantically similar texts have similar encoding. This enables efficient and reliable comparison of different topics (i.e., a determination of similarity) at a semantic level by using various mathematical formulations like Euclidean distance, cosine distance, etc. The embedding of a topic may be computed in different ways. For example, it could be the average of Global Vector or GloVe embeddings of the constituent tokens of a topic. The embedding could also be calculated using BERT (or Bidirectional Encoder Representations from Transformers) or any of its variations. Then similarity may be computed across all pairs of topic embeddings. Second, the list of topics is traversed in descending order of similarity. A topic is associated with another topic if its similarity is above a certain threshold. If a topic is already associated with another topic, then it is not used in a further grouping. Once this process is complete, groups of semantically similar topics are obtained. This type of grouping helps in distilling a wide range of topics into a smaller set of semantically distinct, and hence more compact, topics. Third, each of the groups of topics may be labeled. That is, for each group of topics, a topic label is identified for easy reference. The challenge is to find the most representative label for the group. While several approaches may be used, the topic having the highest degree of similarity with all of the other topics in the group may be identified as the label of the group.

As a next step, utterances are associated with each of the topic group. This may include associating with the group the utterance corresponding to each of the topics within the group. Additionally, phrases or segments may be extracted from the utterances and then associated with the topic group. Specifically, the utterances related to topics of a topic group are obtained from the metadata, which was stored as part of keyphrase extraction and topic identification processes. As used herein, utterances refer to the whole conversation turns communicated by customer or agent in a conversation. Just as semantically similar topics are grouped together under a topic label, utterances belonging to all the topics in a group are brought together. However, for several of the use cases related to topic mining, the association of whole utterances with the topic groups may produce the best results. For example, in topic spotting scenarios, systems need to be trained with smaller and more precise context around topics. Training topic models using whole utterances may add noise and result in reduced effectiveness. Because of this, in accordance with exemplary embodiments, the utterances may be shortened or refined into segments, which may be referred to as "utterance segments". The utterance segments are chosen in accordance with the objective of shortening the statement while also providing sufficient context identifying the topic covered therewithin. For example, consider a topic that is labeled as "loan application" and includes the following utterances:

"Hi, I want to know the status of my loan application. My account number is 12345."
"I would like to know the status of my loan application."
"What is the status of my loan application?"
"What is the status of my credit application?"
"Need to know the status of my credit application. Loan account number is 12345."

From these utterances, two utterance segments may be obtained for "loan application" topic, which are: a) "status of my loan application"; and b) "status of my credit application". These utterance segments are more compact and hence more useful in training topic spotting systems.

In accordance with an exemplary embodiment, utterance segments may be extracted from utterances associated with a topic in the following way. First, a start character offset and an end character offset of an utterance segment present within an utterance are obtained. Then the segment belonging to a slightly larger window on either side of the offsets is obtained. This windowing may be done in a heuristic fashion. For example, if the start and end offsets of an utterance segments from the beginning of an utterance is, say, 32 and 45, respectively, a window may be chosen from 'N' characters behind 32 and 'N' characters after 45. If N=10, then the text segment between offsets 22 and 55 would be obtained. The text may be expanded to the nearest word breaks present to avoid partial words in phrases. If the start or end of text is reached, then the traversal is stopped. The number of characters 'N' used to obtain the larger window may be configurable parameter by a user.

As a next step, Personally Identifiable Information (PII) information that may be present in phrases may be identified and removed so that it is not stored. In accordance with an exemplary embodiment, PII entities may be identified using conventional means, such as a Named Entity Resolver tool. Once identified, each PII entity is removed or masked. This step can be omitted if the input conversations are already anonymized. For example, PII entities that are masked include name, phone number, email, and SSN. In addition, entities related to geographical location, dates, and any digits are also masked for additional security against using personal data. This process is repeated across each of the utterances of each of the topic groups. For example, consider this utterance:

"Hi, I need to book a flight from Washington D.C. to Miami on August 15 under the name of John Honai."

After masking, the utterance becomes:

"Hi, I need to book a flight from <GEO> <GEO> to <GEO> on <DATE> <DATE> under the name of <PERSON> <PERSON>."

In addition to mining topics and their associated utterances/utterance-segments, the topic manager 258 may include analytics and metrics related to the identified topics. Such metrics may be computed automatically and reported to predetermined users. Such metrics may include one or more of the following. As will be appreciated, such analytics may enable administrators and supervisors to better understand their customers better and take appropriate actions based on changes seen in the topics being mined.

In accordance with exemplary embodiments, a first analytic is referred to as a "topic volume metric". The topic volume metric refers to the number of conversations that include a specific topic, or more specifically, one of the topics grouped within a topic group. The topic volume metric may be expressed in terms of a percentage of conversations that raise one of the topic groups. As will be appreciated, this metric may help to understand the relative importance of topics based on the frequency that they occur within a set of conversations. This metric may be expressed in a way that shows how it has changed over time. In accordance with exemplary embodiments, a second analytic is referred to as an "utterance segment metric". The utterance segment metric refers to the number of utterance segments associated with a given topic group. This metric provides a supervisor with an indication as to how many similar utterance segments are included within one of the topic groups. Similarly, in accordance with exemplary embodiments, a third analytic is referred to as an "utterance metric." The utterance metric refers to the total number of utterances found for a topic group in the set of conversations.

Additionally, once the topics and utterances are mined, the process may further allow a supervisor to interact with the output. This step represents an editing stage, where topics and utterances can be fine-tuned or pruned before they are used by the topic manager. The administrator may perform various actions on the mined topic data, such as: selecting one or more topics; selecting utterances associated with a topic group; view utterances associated with utterance segments to understand the broader context in which a topic has appeared; merge two or more topic groups into a single topic, which results in the merger of the associate utterances; split a topic group into multiple topic groups, which would include splitting of associated utterances also; and rename a topic group label.

At the end of this process, a set of topic and associated utterances is produced or, in other cases, an existing set of topics and associated utterances is modified to include new topics and/or new associated utterances (or associated utterance segments). The set of topic and associated utterances, or output, of the topic mining process may then be used in various downstream applications. More specifically, the output may be downloaded as a CSV or JSON file and used as input to other systems with appropriate modification. The output may also be exported to an application like the topic manager module where multiple topics and corresponding utterances can be defined and put to use. Such applications can also be used to train machine learning models for topics using their utterance segments, which may make spotting topics in real-time or offline conversations more efficient.

Accordingly, per an exemplary embodiment, a method is disclosed for mining topics in conversations. The method may include: receiving, by a processor, conversation data that includes text derived from the conversations that occurred between a customer and agent; and using, by the processor, a topic mining algorithm to automatically mine topics from the conversations of the conversation data. The topic mining algorithm may include the step of identifying candidate topics in each of the conversations. When described in relation to an exemplary first conversation of the conversations, the step of identifying candidate topics may include: identifying utterances in the first conversation, wherein an utterance is defined as a turn within the first conversation in which the customer, in the form of a customer utterance, or the agent, in the form of an agent utterance, is communicating; tagging each word in the utterances with a part-of-speech (POS) tag; based on the POS tags, identifying keywords from the utterances, wherein a keyword is defined as a word having a POS tag indicating the word is one of a noun, adjective, and verb; using a graph-based ranking algorithm to determine a relative importance of the keywords in the first conversation and calculating a keyword importance score for each of the keywords according to the determined relative importance; identifying keyphrases in the first conversation, wherein the keyphrases are defined as the keywords in instances when the keywords appear consecutively; calculating a keyphrase importance score as a sum of the keyword importance scores for the keywords included within the keyphrase and determining a relative importance of each of the key phrases in the first conversation by comparing the calculated keyphrase importance scores; and selecting as candidate topics from the first conversation a predetermined number of the keyphrases having a highest keyphrase importance score. The topic mining algorithm may further include the step of identifying the topics of the conversations by: compiling a list of the candidate topics found in the conversations; pruning the list of candidate topics by discarding certain of the candidate topics in accordance with a cross-conversation factor that factors the candidate topics usage across all of the conversations; and identifying the candidate topics remaining on the pruned list of candidate topics as the topics. The topic mining algorithm may further include the step of determining topic groups by grouping the topics into the topic groups according to a degree of semantic similarity between the topics; and associating a list of utterances with the topic groups by compiling the utterances corresponding to the topics included within each of the topic group and associating the compiled utterances therewith.

In accordance with exemplary embodiments, the method may further include the step of uploading the mined topics as topic data into a topic manager module that, in response to the uploading, automatically performs one or more actions related to the uploaded topic data. The uploaded topic data may include: one or more topic groups that each defines a set of semantically similar topics; for each of the one or more topic groups, a label; and for each of the one or more topic groups, one or more of the topics and respective one or more utterances associated with the one or more topics. In accordance with exemplary embodiments, the one or more actions may include presenting, by the topic manager module, on a user device of a supervisor of the contact center aspects of the uploaded topic data; receiving, by the topic manager module, at least one edit in relation to the topic data from input received from the user device of the supervisor; and using, by the topic manager module, the edited topic data to spot topics in conversation data related to other conversations. The received edit may include at least one of: splitting a given topic group into multiple topic groups and dividing the utterances associated with the given topic group among the multiple topic groups; and combining two or more topic groups into a single topic group and combining the utterances associated with the two or more topic groups for association with the single topic group.

In accordance with other embodiments, the one or more actions may include: using, by the topic manager module, the uploaded topic data to spot topics in conversation data related to other conversations; calculating, by the topic manager module, a metric related to at least one of the topics in the uploaded topic data in relation to the conversation data of the other conversations; and reporting, by the topic manager module, the calculated metric to a supervisor of the contact center via an electronic communication. The metric may include a topic volume metric that calculates a percentage of conversations of the other conversations in which the at least one of the topics of the uploaded topic data is discussed. The metric may include an utterance segment volume metric that calculates a number of utterance segments associated with a given topic group.

According to exemplary embodiments, the cross-conversation factor may include calculating an updated keyphrase importance score for a given keyphrase by averaging the keyphrase importance scores for the given keyphrase in multiple ones of the conversations. In alternative embodiments, the cross-conversation factor comprises calculating a frequency of occurrence of the each of the keyphrases across the conversations and the pruning comprises discarding the keyphrases having a calculated frequency of occurrence that does not satisfy a predetermined threshold.

In accordance with exemplary embodiments, the grouping of the topics in accordance with the degree of semantic similarity may include: calculating an embedding for each of the topics, wherein an embedding comprises an encoded representation of text in which texts that are semantically similar have similar encoded representations; comparing the calculated embeddings to determining the degree of semantic similarity between pairs of the topics; and grouping the topics having a degree of semantic similarity above a predetermined threshold. The embedding may be calculated as Global Vectors embeddings of the keyphrase of each of the topics. The comparing the calculated embeddings may include at least one of Euclidean distance and cosine similarity.

As will be appreciated, the presently described systems and methods offer several advantages. The present invention provides for efficient and unsupervised mining of topics and associated utterances from a large amount of natural language conversations. Conversations can be consumed by such a system as either a text file or from other storage platforms. Present systems and methods provide the ability to identify and group topics and associated utterances having similar semantic meaning. Further, privacy is protected by anonymizing utterances through PII masking. Further, the topic analytics that are provided provide insights into conversational data about customers. The present topic manager also allows users to efficiently review mined results and make changes thereto by selecting, renaming, regrouping, and/or discarding mined topics and associated utterances. Once complete, the mined topics and associated utterances may be conveniently exported into other applications for use thereby, including export into systems that used the mined output to build machine learning models for real-time identification of topics in conversation data.

As one of skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the present application as defined by the following claims and the equivalents thereof That which is claimed:

1. A computer-implemented method related to mining topics discussed in conversations, the method comprising:
   receiving, by a processor, conversation data, the conversation data comprising text derived from the conversations that occurred between a customer and agent; and
   using, by the processor, a topic mining algorithm to automatically mine topics from the conversations of the conversation data;
   wherein the topic mining algorithm comprises the steps of:
      for each of the conversations, identifying candidate topics for the respective conversation by:
         identifying utterances in the respective conversation;
         tagging each word in the utterances with a part-of-speech (POS) tag;
         based on the POS tags, identifying keywords from the utterances, wherein each of the keywords is a word having a corresponding POS tag indicating the word is one of a noun, an adjective, and a verb;
         using a graph-based ranking algorithm, determining a relative importance of the keywords in the respective conversation and calculating a keyword importance score for each of the keywords according to the determined relative importance;
         identifying keyphrases in the respective conversation, wherein each of the keyphrases includes two or more keywords appearing consecutively in the respective conversation;
         for each of the keyphrases, calculating a keyphrase importance score as a sum of the keyword importance scores for the two or more keywords included within the corresponding keyphrase; and
         selecting a predetermined number of the keyphrases as the candidate topics of the respective conversation based on the keyphrase importance scores;
      identifying topics of the conversations among on the candidate topics of each of the conversations by:
         compiling a list of the candidate topics of each of the conversations;

determining a cross-conversation factor indicative of an overall usage of the candidate topics across the conversations of the conversation data, wherein the cross-conversation factor includes an average keyphrase importance score for each of the candidate topics across the conversations;

pruning the list of the candidate topics by discarding one or more candidate topics in accordance with a cross-conversation factor; and identifying the candidate topics remaining on the pruned list of candidate topics as the topics of all of the conversation of the conversation data;

determining topic groups by grouping the topics of the conversations into the topic groups according to a degree of semantic similarity between the topics; and associating a list of utterances with the topic groups by compiling the utterances corresponding to the topics of the conversations included within each of the topic group and associating the compiled utterances therewith.

2. The method of claim 1,
further comprising the step of uploading, by the processor, the topics as topic data into a topic manager that, in response to the uploading, automatically performs one or more actions related to the uploaded topic data;
wherein the uploaded topic data comprises:
the topic groups that each defines a set of semantically similar topics;
for each of the topic groups, a label; and
for each of the topic groups, one or more of the topics and respective one or more utterances associated with the one or more topics.

3. The method of claim 2, wherein the step of determining the topic groups further comprises selecting the label for each of the topic groups; and
wherein the label for a given topic group is selected as being the topic in the given topic group having the highest degree of semantic similarity with the other topics within the given topic group.

4. The method of claim 2, wherein the graph-based ranking algorithm comprises a word graph configured to score a co-occurrence relationship between the keywords of the conversation.

5. The method of claim 2, wherein the graph-based ranking algorithm comprises a text rank algorithm.

6. The method of claim 2, wherein the one or more actions comprises:
presenting, by the topic manager, on a user device of a supervisor of the contact center aspects of the uploaded topic data;
receiving, by the topic manager, at least one edit in relation to the topic data from input received from the user device of the supervisor; and
using, by the topic manager, the edited topic data to spot topics in conversation data related to other conversations;
wherein the received edit comprises at least one of:
splitting a given topic group into multiple topic groups and dividing the utterances associated with the given topic group among the multiple topic groups; and
combining two or more of the topic groups into a single topic group and combining the utterances associated with the two or more of the topic groups for association with the single topic group.

7. The method of claim 2, wherein the one or more actions comprises:
using, by the topic manager, the uploaded topic data to spot topics in conversation data related to other conversations;
calculating, by the topic manager, a metric related to at least one of the topics in the uploaded topic data in relation to the conversation data of the other conversations; and
reporting, by the topic manager, the calculated metric to a supervisor of the contact center via an electronic communication.

8. The method of claim 7, wherein the metric comprises a topic volume metric that calculates a percentage of conversations of the other conversations in which the at least one of the topics of the uploaded topic data is discussed.

9. The method of claim 7, wherein the metric comprises an utterance segment volume metric that calculates a number of utterance segments associated with a given topic group.

10. The method of claim 7, wherein the step of identifying the keyphrases in the first conversation comprises concatenating the consecutively ordered keywords to form a keyphrase.

11. The method of claim 7, wherein the cross-conversation factor further comprises calculating a frequency of occurrence of the each of the keyphrases across the conversations and the pruning comprises discarding the keyphrases having a calculated frequency of occurrence that does not satisfy a predetermined threshold.

12. The method of claim 7, wherein the grouping of the topics in accordance with the degree of semantic similarity comprises:
calculating an embedding for each of the topics, wherein an embedding comprises an encoded representation of text in which texts that are semantically similar have similar encoded representations;
comparing the calculated embeddings to determining the degree of semantic similarity between pairs of the topics; and
grouping the topics having a degree of semantic similarity above a predetermined threshold.

13. The method of claim 12, wherein the embedding is calculated as Global Vectors embeddings of the keyphrase of each of the topics; and
wherein the comparing the calculated embeddings comprises at least one of Euclidean distance and cosine similarity.

14. The method of claim 7, wherein the step of associating the list of utterances with the topic groups further comprises extracting utterance segments from respective utterances for association with the topic groups;
wherein an utterance segment comprises a shortened statement contained within an utterance that is selected in accordance with competing criteria of shortening the utterance while maintaining sufficient context.

15. The method according to claim 14, wherein an utterance segment is extracted from the corresponding utterances by:
defining a window within a given utterance by a start character offset and an end character offset;
expanding the window at both the start character offset and the end character offset by an offset, the offset comprising a number of characters; and
deeming the words contained within the expanded window as the utterance segment.

16. A system for mining topics discussed in conversations, the system comprising:
a processor; and a memory, wherein the memory stores instructions that, when executed by the processor, cause the processor to perform the steps of:
receiving conversation data, the conversation data comprising text derived from the conversations that occurred between a customer and agent; and
using a topic mining algorithm to automatically mine topics from the conversations of the conversation data;
wherein the topic mining algorithm comprises the steps of:
for each of the conversations, identifying candidate topics for the respective conversation by:
identifying utterances in the respective conversation;
tagging each word in the utterances with a part-of-speech (POS) tag;
based on the POS tags, identifying keywords from the utterances, wherein each of the keywords is a word having a corresponding POS tag indicating the word is one of a noun, an adjective, and a verb;
using a graph-based ranking algorithm, determining a relative importance of the keywords in the respective conversation and calculating a keyword importance score for each of the keywords according to the determined relative importance;
identifying keyphrases in the respective conversation, wherein each of the keyphrases includes two or more keywords appearing consecutively in the respective conversation;
for each of the keyphrases, calculating a keyphrase importance score as a sum of the keyword importance scores for the two or more keywords included within the corresponding keyphrase;
selecting a predetermined number of the keyphrases as the candidate topics of the respective conversation based on the keyphrase importance scores;
identifying topics of the conversations among on the candidate topics of each of the conversations by:
compiling a list of the candidate topics of each of the conversations;
determining a cross-conversation factor indicative of an overall usage of the candidate topics across the conversations of the conversation data, wherein the cross-conversation factor includes an average keyphrase importance score for each of the candidate topics across the conversations;
pruning the list of the candidate topics by discarding one or more candidate topics in accordance with a cross-conversation factor; and
identifying the candidate topics remaining on the pruned list of candidate topics as the topics of all of the conversation of the conversation data;
determining topic groups by grouping the topics of the conversations into the topic groups according to a degree of semantic similarity between the topics; and
associating a list of utterances with the topic groups by compiling the utterances corresponding to the topics of the conversations included within each of the topic group and associating the compiled utterances therewith.

17. The system according to claim 16,
wherein the instructions, when executed by the processor, further cause the processor to perform the step of:
uploading the mined topics as topic data into a topic manager that, in response to the uploading, automatically performs one or more actions related to the uploaded topic data;
wherein the uploaded topic data comprises:
the topic groups that each defines a set of semantically similar topics;
for each of the topic groups, a label; and
for each of the topic groups, one or more of the topics and respective one or more utterances associated with the one or more topics.

18. The system according to claim 17, wherein the graph-based ranking algorithm comprises a text rank algorithm;
wherein the one or more actions comprises:
presenting, by the topic manager, on a user device of a supervisor of the contact center aspects of the uploaded topic data;
receiving, by the topic manager, at least one edit in relation to the topic data from input received from the user device of the supervisor; and
using, by the topic manager, the edited topic data to spot topics in conversation data related to other conversations;
wherein the received edit comprises at least one of:
splitting a given topic group into multiple topic groups and dividing the utterances associated with the given topic group among the multiple topic groups; and
combining two or more of the topic groups into a single topic group and combining the utterances associated with the two or more of the topic groups for association with the single topic group.

19. The system of claim 17, wherein the graph-based ranking algorithm comprises a text rank algorithm;
wherein the one or more actions comprises:
using, by the topic manager, the uploaded topic data to spot topics in conversation data related to other conversations;
calculating, by the topic manager, a metric related to at least one of the topics in the uploaded topic data in relation to the conversation data of the other conversations; and
reporting, by the topic manager, the calculated metric to a supervisor of the contact center via an electronic communication;
wherein the metric comprises a topic volume metric that calculates a percentage of conversations of the other conversations in which the at least one of the topics of the uploaded topic data is discussed.

* * * * *